United States Patent
Li et al.

(10) Patent No.: US 9,509,787 B2
(45) Date of Patent: Nov. 29, 2016

(54) USER STATUS DISPLAYING METHOD, AND SERVER

(71) Applicant: Huawei Technologies Co., Ltd., Shenzhen (CN)

(72) Inventors: Zijun Li, Shenzhen (CN); Ning Piao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 13/727,772

(22) Filed: Dec. 27, 2012

(65) Prior Publication Data

US 2013/0179512 A1    Jul. 11, 2013

Related U.S. Application Data

(63) Continuation of application No. PCT/CN2012/079017, filed on Jul. 23, 2012.

(30) Foreign Application Priority Data

Jan. 9, 2012  (CN) .......................... 2012 1 0004380

(51) Int. Cl.
   *G06F 15/16* (2006.01)
   *H04L 29/08* (2006.01)
   *H04L 29/06* (2006.01)

(52) U.S. Cl.
   CPC ............... *H04L 67/22* (2013.01); *H04L 67/38* (2013.01)

(58) Field of Classification Search
   CPC ........................................................ H04L 67/22
   USPC ................................................. 709/204, 205
   See application file for complete search history.

(56) References Cited

U.S. PATENT DOCUMENTS

| | | | |
|---|---|---|---|
| 6,009,460 A * | 12/1999 | Ohno et al. | 709/204 |
| 7,116,284 B2 * | 10/2006 | Kato et al. | 345/2.1 |
| 2008/0114666 A1 * | 5/2008 | Jiao et al. | 705/26 |

(Continued)

FOREIGN PATENT DOCUMENTS

| | | | |
|---|---|---|---|
| CN | 1690988 A | | 11/2005 |
| CN | 1859117 A | | 11/2006 |

(Continued)

OTHER PUBLICATIONS

Chinese Office Action received in Application No. 201210004380.7, mailed Feb. 7, 2014, 4 pages.

(Continued)

*Primary Examiner* — David Lazaro
*Assistant Examiner* — Marie Georges Henry
(74) *Attorney, Agent, or Firm* — Slater Matsil, LLP

(57) ABSTRACT

A method for displaying user status is provided. The method includes: obtaining original information of a user from an information source which is an application, by calling an application programming interface (API) of the information source, wherein the original information comprises an identifier of the user in the information source, contents posted by the user in the original source; parsing the original information of the user, and obtaining user status information of the user; obtaining a virtual image of the user which matches the user status information from a virtual image database according to the user status information; and notifying a virtual image displaying terminal to display the virtual image of the user.

16 Claims, 2 Drawing Sheets

(56) References Cited

U.S. PATENT DOCUMENTS

| | | |
|---|---|---|
| 2008/0284779 A1 | 11/2008 | Gu et al. |
| 2009/0083642 A1* | 3/2009 | Kim .................. G06F 17/30038 715/762 |
| 2009/0177607 A1 | 7/2009 | Matsushima |
| 2009/0248700 A1 | 10/2009 | Amano et al. |
| 2009/0300525 A1 | 12/2009 | Jolliff et al. |
| 2010/0023878 A1* | 1/2010 | Douris et al. ................ 715/757 |
| 2011/0271230 A1* | 11/2011 | Harris et al. ................. 715/810 |
| 2012/0317039 A1* | 12/2012 | Kaplinger et al. ........... 705/310 |

FOREIGN PATENT DOCUMENTS

| | | |
|---|---|---|
| CN | 101127737 A | 2/2008 |
| CN | 102571633 A | 7/2012 |
| EP | 2230643 A1 * | 9/2010 |
| JP | 2001160021 A | 6/2001 |
| JP | 2005276103 A | 10/2005 |
| JP | 2007072511 A | 3/2007 |
| JP | 2007328705 A | 12/2007 |
| JP | 2008027043 A | 2/2008 |
| JP | 2008092163 A | 4/2008 |
| JP | 2008107895 A | 5/2008 |
| JP | 2009245289 A | 10/2009 |
| JP | 2011013972 A | 1/2011 |
| JP | 2011523486 A | 8/2011 |
| KR | 20060133607 A | 12/2006 |

OTHER PUBLICATIONS

Chinese Search Report received in Application No. 201210004380.7, mailed Jan. 22, 2014, 2 pages.

International Search Report and Written Opinion for International Application No. PCT/CN2012/079017 received Nov. 1, 2012, 12 pages.

Kome: Do Not Eat, What HTML5 Can Do, I/O , vol. 35, No. 7, Japan, Kohgaku-Sha Co., Ltd., vol. 35, 3 pages (Partial Translation).

* cited by examiner

USER STATUS DISPLAYING METHOD, AND SERVER

This application is a continuation of International Application No. PCT/CN2012/079017, filed Jul. 23, 2012 and titled "USER STATUS DISPLAYING METHOD, DISPLAYING TERMINAL, AND SERVER", which claims priority to Chinese Patent Application No. 201210004380.7, filed with the Chinese Patent Office on Jan. 9, 2012 and titled "USER STATUS DISPLAYING METHOD, DISPLAYING TERMINAL, AND SERVER", both of which are incorporated herein by reference in their entireties.

TECHNICAL FIELD

The present disclosure relates to the communication field, and in particular, to a user status displaying method, a virtual image displaying terminal, and a virtual image server.

BACKGROUND

With the development of Internet services, people communicate with each other by using more and more diversified modes, from the conventional telephone, short message, and Email to recent instant messaging, micro-blogging, social networking services (SNS), and so on. The diversified communication modes provide more communication opportunities, but the communication effect is poorer than that of face-to-face communication.

To enhance interactivity, all network applications in the prior art provide user status displaying, including displaying a user mood and a virtual image. The user status is usually displayed in an address book, for example, in the address book on a mobile phone, in the address book of instant messaging software, in the user information of SNS, and in the user information of micro-blogging. The displaying is displaying of an image or a paragraph of texts, where the image includes a self-shot photo, a cartoon image, a scene, and so on, and the texts include the description about the user status. A user may manually replace the image or modify texts to adjust the user status. However, using the image and text content is far insufficient for displaying the particular mood and status of the user.

SUMMARY OF THE INVENTION

Embodiments of the present invention provide a method for displaying a user status and a server.

In one aspect, the present invention provides a method for displaying user status. The method includes: obtaining original information of a user from an information source which is an application, by calling an application programming interface (API) of the information source, wherein the original information comprises an identifier of the user in the information source, contents posted by the user in the original source; parsing the original information of the user, and obtaining user status information of the user; obtaining a virtual image of the user which matches the user status information from a virtual image database according to the user status information; and notifying a virtual image displaying terminal to display the virtual image of the user.

In another aspect, the present invention provides a virtual image server, which includes: an obtaining unit, configured to obtain original information of a user from an information source which is an application, by calling an application programming interface (API) of the information source, wherein the original information comprises an identifier of the user in the information source, contents posted by the user in the original source; a parsing unit, configured to parse the original information of the user, and obtain user status information of the user; a matching unit, configured to obtain a virtual image of the user which matches the user status information from a virtual image database according to the user status information obtained by the parsing unit; and a notifying unit, configured to notify a virtual image displaying terminal to display the virtual image of the user.

With the method for displaying user status according to some embodiments of the present invention, the virtual image reflects the mood and status of the real user to some extent, and provides a new means of self-expression for the user. In addition, in the tense modern life, friends can contact each other without using real-time phones or short messages, thereby saving communication time.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
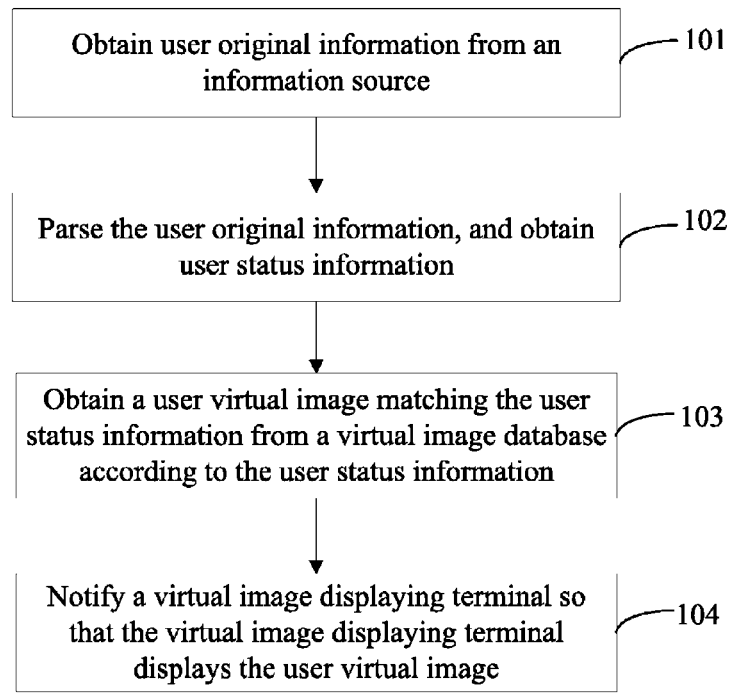
FIG. 1 is a flowchart of a user status displaying method according to an embodiment of the present invention.

FIG. 1 is a flowchart of a user status displaying method according to an embodiment of the present invention. The method includes the following steps:

101. Obtain user original information from an information source.

Specifically, this step involves an original information obtaining unit and an information source. The original information obtaining unit is responsible for obtaining user related information from different information sources, and needs to adapt to the interface of the information source. For example, to obtain the speech content of a particular user from Sina micro-blogging, it is necessary to obtain the user original information according to the interface provided by Sina micro-blogging.

Optionally, the original information obtaining unit may be a part of the virtual image server, or a separate apparatus. The information source is an application in the Internet or a terminal. Any application which is open and from which user original information can be obtained may serve as an information source. The information source may be classified into two types: a passive type, which requires that the original information obtaining unit should perform active search and analysis to obtain the user status, and an active type, which actively reports the user original information to the original information obtaining unit after a user or a friend of the user actively updates the status.

Figure 2:
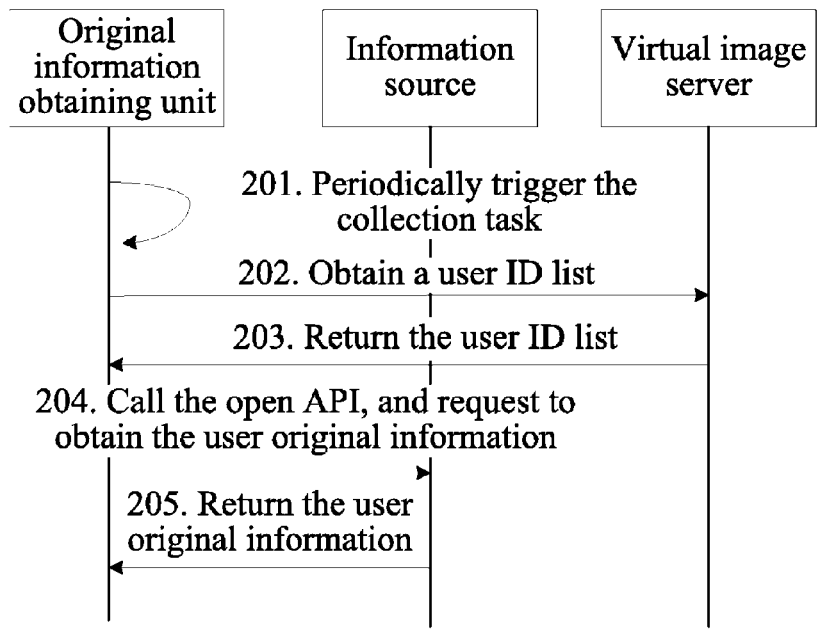
FIG. 2 is a signaling flowchart of obtaining user original information according to an embodiment of the present invention.

As shown in FIG. 2, this step includes the following steps:

201. The original information obtaining unit periodically triggers the user original information collection task.

A timer may be set to start the collection task at an interval. The timer may record the previous collection time, and may also define that the task currently started is to collect new user original information in an incremental way.

202. The original information obtaining unit obtains a user ID list from the virtual image server.

Optionally, the obtaining process may be as follows: The original information obtaining unit actively requests to obtain the user ID list from the virtual image server, or the virtual image server delivers the user ID list to the original information obtaining unit beforehand. The specific user ID list may include an information source ID and a user ID registered on the information source by the user, so that the information obtaining unit obtains the user original information from the information source according to the user ID list through the open interface provided by the information source.

203. The virtual image server returns the user ID list to the original information obtaining unit.

204. The original information obtaining unit calls, according to the obtained information source ID, an open application programming interface (API) of the information source.

Specific parameters are input according to the API requirement of the information source, so that the user original information is obtained from the information source through the API interface. The user original information may include the information such as the user identifier of the user on the information source, published article or contents, and publishing time.

205. The information source returns the user original information to the original information obtaining unit.

102. Parse the user original information, and obtain user status information.

After obtaining the user original information from the information source, the original information obtaining unit may send the user original information to the virtual image server, so that the virtual image server parses the user original information to obtain the user status information. Optionally, the original information obtaining unit may also parse the obtained user original information to obtain the user status information and then return the user status information to the virtual image server.

The parsing method may be extracting a keyword indicating the user status as user status information by using an extraction algorithm, for example, the part-of-speech tagging and text classification technology.

Optionally, the virtual image server has a synonym/near-synonym library, and the above extracted keyword is extended through the library to increase the coverage of the user status information, so that the virtual image server matches a suitable virtual image more easily and conveniently.

The following takes Sina micro-blogging as an example to describe how to obtain user original information.

The following is input parameters of the Sina micro-blogging API "returning a list of micro-blogging messages lately published by the user":

|  | Mandatory | Type and Range | Description |
| --- | --- | --- | --- |
| source | true | string | AppKey allocated when an application is requested, a unique identity for representing the application when an interface is invoked. (This parameter is not required when the OAuth authorization mode is used) |
| :id | false | int64/string | A list of new micro-blogging messages of the specified user is returned according to the user ID (int64) or micro-blogging nickname (string). The parameter is a REST style parameter. See the note. |
| user_id | false | int64 | User ID, mainly used to distinguish the user ID from the micro-blogging nickname. This parameter is recommended when the micro-blogging nickname that is a number and the user ID have ambiguous meanings, and especially when the micro-blogging nickname and the user ID are the same. |
| screen_name | false | string | Micro-blogging nickname, mainly used to distinguish the user identifier from the micro-blogging nickname. This parameter is recommended when the micro-blogging nickname and the user ID are the same. |
| since_id | false | int64 | If this parameter is specified, only the micro-blogging message whose ID is greater than since_id (namely, later than the publishing time of since_id) is returned. |
| max_id | false | int64 | If this parameter is specified, a micro-blogging message whose ID is smaller than or equal to max_id is returned. |
| count | false | Int, default value 20, maximum value 200 | It indicates the number of records returned on each page. |
| page | false | Int, default value 1 | Page. Note: Content of at most 200 pages can be returned. |
| base_app | false | int | Whether to obtain data based on the current application. 1 indicates that the application micro-blogging is limited, and 0 indicates that the application |

| Mandatory | Type and Range | Description |
|---|---|---|
| feature false | int | micro-blogging is not limited. Micro-blogging type, 0: all, 1: original, 2: picture, 3: video; 4: music. This parameter is used to return micro-blogging information content of the specified type. |

If none of :id, user_id, and screen_name is specified, a list of micro-blogging messages lately published by the login user is returned.

The following is a example of a result returned by Sina micro-blogging upon receiving the above request:

```
<?xml version="1.0" encoding="UTF-8"?>
<statuses>
<status>
<created_at>Mon Nov 29 16:08:43 +0800 2010</created_at>
<id>3958728723</id>
<text> Hello, developers, our forum is online: http://sinaurl.cn/
h4FWc7. Welcome to our forum. In addition, if you have any technical
problem, publish the problem on the forum or on the official technical
support account @micro-blogging API. Thank you for your support to the
open platform [hey]</text>
    <source>
    <a href="http://t.sina.com.cn">sina micro-blogging</a>
    </source>
    <favorited>false</favorited>
    <truncated>false</truncated>
    <geo/>
    <in_reply_to_status_id/>
    <in_reply_to_user_id/>
    <in_reply_to_screen_name/>
    <user>
    <id>11051</id>
    <screen_name>micro-blogging open platform</screen_name>
    <name>micro-blogging open platform</name>
    <province>11</province>
    <city>8</city>
    <location>Beijing Haidian district</location>
    <description> official marketing account of Sina micro-blogging
open platform. If you have any technical problem, send it to the
@micro-blogging API or send a private message to the micro-blogging
API </description>
    <url>http://open.t.sina.com.cn/</url>
    <profile_image_url>http://tp4.sinaimg.cn/11051/50/1280283165/1
</profile_image_url>
    <domain>openapi</domain>
    <gender>m</gender>
    <followers_count>13034</followers_count>
    <friends_count>5</friends_count>
    <statuses_count>157</statuses_count>
    <favourites_count>0</favourites_count>
    <created_at>Wed Jan 20 00:00:00 +0800 2010</created_at>
    <following>false</following>
    <verified>true</verified>
    <allow_all_act_msg>true</allow_all_act_msg>
    <geo_enabled>true</geo_enabled>
    </user>
</status>
</statuses>
```

By parsing the returned search result, required information is obtained: speech and operation record of the user on the information source, and so on. In the returned message, the content is the expected collection result, and the important attribute is the publishing time and published content:

```
<created_at>Mon Nov 29 16:08:43 +0800 2010
</created_at>
<id>3958728723</id>
<text> Hello, developers, our forum is online: http://sinaurl.cn/
h4FWc7. Welcome to our forum. In addition, if you have any technical
problem, publish the problem on the forum or on the official technical
support account @micro-blogging API. Thank you for your support
to the open platform [hey]</text>
```

Further analysis is performed for the parsed content by using an algorithm, for example, part-of-speech tagging and text classification, to obtain the user status information. Examples of the user status information are the user ID, operation type (such as posting a topic on micro-blogging or posting a topic on a forum and commenting), and operation content keyword (for example, Dongmen, shopping, and happy). The structured user status information is sent to the virtual image server, so that the virtual image server matches a suitable virtual image according to the user status information. It should be noted that the structured user status information may be designed according to the requirement, and is not limited to the above structures. In addition, the used content extraction algorithm may also be other algorithms, and other text analysis technologies are used to improve accuracy of the analyzed content.

103. Obtain a user virtual image matching the user status information from a virtual image database according to the user status information.

The virtual image complies with the HTML5 standard, and includes three parts: multimedia content, for example, background image, multiple-layer foreground image, video, interactive image, and audio; JavaScript script and CSS script controlling the above multimedia content; and description (a group of tags) about the virtual image. The use of the above multimedia content by different virtual images varies. For example, only a picture is used, or a snow effect is added on the picture; a video is used; a picture and background music are used; or a cartoon segment is used.

The virtual image provides an uniform resource identifier (URI) for the user to access on the Internet, that is, if the above address is input in the browser, the content of the address can be played. Each URI corresponds to the minimum unit of the virtual image, which is called an image segment; each image segment expresses a certain topic (the topic is described by tags), and each segment can last a period.

Multiple segments of the same topic or similar topics constitute a group of virtual images, for example, in a group of virtual images whose topic is the cartoon character pleasant goat, some segments express the happy state, the angry state, or the sleeping state, and so on, which can be initially defined by the producer by using tags (the user may also modify the tags after subscription). Whether multiple image segments are within a group is specified by the producer or the user. Each group has a group ID. Therefore, when a subscriber to the virtual image shares the virtual image with friends, sharing can be performed in units of groups.

Different virtual images have different expressive force. For example, the facial emotion of a virtual person is suitable for displaying the happy, angry, and surprised states; the action of a virtual person is suitable for displaying the busy state; a picture of a rural scene is suitable for displaying the idle state; a cartoon animal image is suitable for displaying the lovely and amusing states.

The following table is an example of virtual image tags, where the number in brackets indicates the degree of matching between the tag and the content, and 1 indicates completely matching:

| Virtual Image A | Virtual Image B | Virtual Image C |
| --- | --- | --- |
| Happy (0.9) | Running (1) and exercising (0.9) | Amusing (0.8) |
| Eating (0.8) | Sleeping (0.9), dreaming (0.6) | Angry (0.6) |
| Resting (0.9) | Busy (0.7) | Evening (0.8) |
| Sad (0.6), crying (0.7) | Affectionate (0.5) | Tour scene (0.4) |

Optionally, the developer of virtual images packages and uploads the developed virtual images to the virtual image server. The virtual image server manages the uploaded virtual images, and establishes an index for tags of the virtual images for search.

Optionally, a user subscription step is also included. The user views and subscribes to virtual images by using the list, tags, and indexes of virtual images. Because each virtual image segment has special features, if the user wants to obtain a virtual image with strong expressive force, the user needs to subscribe to multiple virtual images. The virtual image server groups the virtual images subscribed to by the user. Each group includes one or more virtual images. Certainly, the user may intervene in the grouping process, and in this way, the virtual image server generates a URI for each group of virtual images. And the virtual image server returns the generated URI to the user for use. Optionally, the user may manage the virtual images, and the management includes: adding a tag, adjusting the displaying priority, adjusting the displaying time period, unsubscribing, manually modifying the user status, and so on. The user may send the virtual image URI to friends, and notify the friends of using the images, where a URI represents a group of virtual images. Thereby, the friends of the user can browse the user virtual images after inputting the URI in the browser. For example, the address book of the terminal of a friend integrates the virtual image displaying function; the URI is added to the address book of the terminal of the friend, and the specific user in the address book is bound with the group of virtual images. In this way, the user terminal may dynamically display the update of the user virtual images. After the user status information is updated, the virtual image server selects a suitable virtual image according to the correspondence and matching between the user status information and the virtual image tag.

104. Notify a virtual image displaying terminal so that the virtual image displaying terminal displays the user virtual image.

After the user status information is updated, the virtual image server notifies, in a push mode, the virtual image displaying terminal of the change of the user status, matches the suitable virtual image according to the updated user status information, and notifies the virtual image displaying terminal of displaying the updated virtual image. Optionally, the virtual image displaying terminal may edit the user status information or affect the user status information by interacting with the interactive virtual image, and trigger the virtual image server to update the user virtual image. For example, when the virtual image is displayed on the terminal, the friend may touch or hit the virtual image, speak to the microphone, or throw the mobile phone (supported by a sensor), input a text, and so on. The interactive information of the friend is transferred to the server, and the server makes analysis and obtains a group of keywords, where the keywords further affect the status of the virtual image. For example, if the virtual image is a cartoon character and the friend "hits" the face of the virtual image, the server analyzes the obtained touch screen action to obtain the "hit" operation, and then drives the virtual image to play the crying voice.

Optionally, the terminal of the friend may actively query the current user status information from the virtual server, so as to trigger the virtual server to update the virtual image, or may also review the historical virtual image by inputting parameters such as a virtual image user ID and query time range.

With the user status displaying method according to the embodiment of the present invention, the virtual image reflects the mood and status of the real user to some extent, and provides a new means of self-expression for the user. In addition, in the tense modern life, friends can contact each other by observing the virtual image and interactive operations other than using real-time phones or short messages, thereby saving time. Meanwhile, as the Internet has a deeper impact on people's life, people's online life becomes an increasingly important part of their life apart from the offline life. Facing different friend groups, people require different incarnations to represent themselves, and multiple virtual images of a person meet the requirement.

Figure 3:
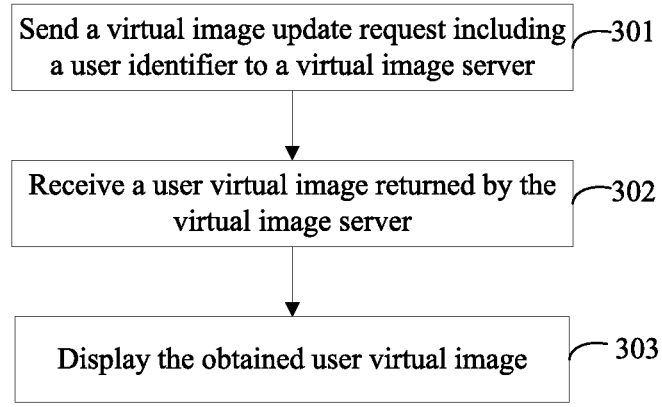
FIG. 3 is a flowchart of a user virtual image displaying method according to another embodiment of the present invention.

FIG. 3 is a flowchart of a user virtual image displaying method according to another embodiment of the present invention, including the following:

301. Send a virtual image update request including a user identifier to a virtual image server.

The virtual image displaying terminal, for example, a mobile phone and a tablet, integrates a virtual image displaying module, such as an address book and an instant messaging application. The virtual image displaying module may display the user virtual image. For example, each contact in the contact list in the address book has a virtual image. For example, for the instant messaging application, each contact in the contact list may have a virtual image, which may be a picture, an animation, a video, and so on. When the user of the virtual image displaying terminal uses the address book or the instant messaging application, the virtual image displaying terminal may be triggered to send a user (such as contact) virtual image update request to the virtual image server so as to display the latest user virtual image.

302. Receive a user virtual image returned by the virtual image server, where the user virtual image is a user virtual image selected by the virtual image server from a virtual image database according to user status information and matching the user status information.

After receiving the user virtual image update request, the virtual image server first obtains the latest user status information, and then selects, according to the user status information, the virtual image matching the user status information from the virtual image server as the current user virtual image. Optionally, the virtual image server may also allocate a group of virtual images to the user according to a user virtual image subscription request; after receiving the user virtual image update request, the virtual image server may select, according to the user status information, a virtual image matching the user status information from the group of virtual images as the current user virtual image, and return the virtual image to the virtual image displaying terminal.

303. Display the obtained user virtual image.

Figure 4:
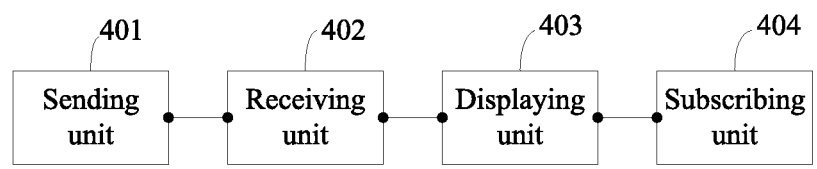
FIG. 4 is a block diagram of a virtual image displaying terminal according to an embodiment of the present invention.

FIG. 4 is a block diagram of a virtual image displaying terminal according to an embodiment of the present invention.

The virtual image displaying terminal includes: a sending unit 401, a receiving unit 402, and a displaying unit 403, and optionally, may further include a subscribing unit 404. The sending unit 401 is configured to send a virtual image update request including a user identifier to a virtual image server; the receiving unit 402 is configured to receive a user virtual image returned by the virtual image server, where the user virtual image is a user virtual image selected by the virtual image server from a virtual image database according to user status information and matching the user status information; and the displaying unit 403 is configured to display the obtained user virtual image. Optionally, the subscribing unit 404 is further included, and is configured to send a virtual image subscription request to the virtual image server so that the virtual image server allocates a group of virtual images to a user according to the subscription request.

The virtual image displaying terminal may be a terminal integrating a virtual image displaying module (such as an address book and an instant messaging application), such as a mobile phone, a computer, or a tablet. When the user of the virtual image displaying terminal uses the address book or the instant messaging application, the sending unit 401 may be triggered to send a user (such as contact) virtual image update request to the virtual image server so as to display the latest user virtual image.

After receiving the user virtual image update request, the virtual image server first obtains the latest user status information, and then selects, according to the user status information, the virtual image matching the user status information from the virtual image server as the current user virtual image. Optionally, the virtual image server may also allocate a group of virtual images to the user according to the user virtual image subscription request; after receiving the user virtual image update request, the virtual image server may select, according to the user status information, a virtual image matching the user status information from the group of virtual images as the current user virtual image, and return the virtual image to the receiving unit 402, so that the displaying unit 403 displays the virtual image.

Figure 5:
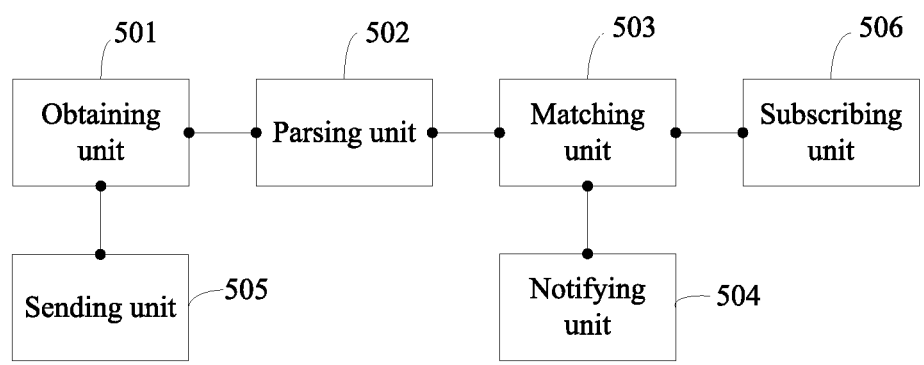
FIG. 5 is a block diagram of a virtual image server according to an embodiment of the present invention.

FIG. 5 is a block diagram of a virtual image server according to an embodiment of the present invention. The virtual image server includes an obtaining unit 501, a parsing unit 502, a matching unit 503, and a notifying unit 504.

Specifically, the obtaining unit 501 is configured to obtain user original information from an information source; the parsing unit 502 is configured to parse the user original information obtained by the obtaining unit 501 and obtain user status information; and the matching unit 503 is configured to obtain a user virtual image matching the user status information from the virtual image database according to the user status information obtained by the parsing unit 502. The notifying unit 504 is configured to notify a virtual image displaying terminal so that the virtual image displaying terminal displays the user virtual image.

Optionally, a sending unit 505 is included, and configured to send a user identifier list to the obtaining unit 501, so that the obtaining unit 501 obtains the user original information from the information source according to the user identifier list.

Specifically, the sending unit 505 sends the user identifier list including an information source ID and the user ID registered on the information source by the user to the obtaining unit 501, and the obtaining unit 501 may be a separate apparatus or may also be a part of the virtual image server. The obtaining unit 501 calls, according to the obtained information source ID, the open application programming interface (API) of the information source, and inputs specific parameters according to API requirements of the information source, and thereby obtains the user original information from the information source through the API interface. The user original information may include the information such as the user identifier of the user on the information source, published article or contents, and publishing time. After obtaining the user original information from the information source, the obtaining unit 501 may send the original information to the parsing unit 502, so that the parsing unit 502 parses the user original information to obtain the user status information. Optionally, the obtaining unit 501 may also parse the obtained user original information to obtain the user status information and then return the user status information to the parsing unit 502.

Optionally, a subscribing unit 506 is included, and configured to subscribe to user virtual images. A user may perform virtual image search, subscribing, grouping, and so on through the subscribing unit 506; the subscribing unit 506 performs grouping management for the virtual images subscribed to by the user and provides the images for the user to use. The matching unit 503 selects, according to the user status information, a virtual image matching the user status information from the group of virtual images allocated by the subscribing unit to the user as the current user virtual image, and notifies, through the notifying unit 504, the virtual image displaying terminal of displaying the current user virtual image.

The virtual image server in the embodiment of the present invention may provide virtual image management, subscribing, and matching. The virtual image reflects the mood and status of the real user to some extent, and provides a new means of self-expression for the user. In addition, in the tense modern life, friends can contact each other without using real-time phones or short messages, thereby saving communication time. Meanwhile, as the Internet has a deeper impact on people's life, people's online life becomes an increasingly important part of their life apart from the offline life. Facing different friend groups, people require different incarnations to represent themselves, and multiple virtual images of a person meet the requirement.

Persons of ordinary skill in the art should understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, a CD-ROM, a read-only memory (Read-Only Memory, ROM), or a random access memory (Random Access Memory, RAM).

In conclusion, the foregoing is merely exemplary embodiments of the present invention, but not intended to limit the protection scope of the present invention. Any modification, equivalent replacement, or improvement made without departing from the spirit principle of the present invention shall fall within the protection scope of the present invention.

What is claimed is:

1. A method for displaying user status, comprising:
   obtaining original information of a user, by a virtual image server device and from an information source, by calling an application programming interface (API) of the information source, wherein the information source is an application, and wherein the original information comprises an identifier of the user in the information source and contents posted by the user in an original source;
   parsing the original information of the user by the virtual image server device by extracting keywords indicating a user status from the contents posted by the user;
   obtaining user status information of the user from the parsed original information;
   obtaining a virtual image of the user from a virtual image database on the virtual image server device, and according to a level of matching between the user status information and one or more tags associated with images of the virtual image database, wherein the virtual image matches the user status information; and
   notifying a virtual image displaying terminal, by the virtual image server device, to display the virtual image of the user.

2. The method according to claim 1, wherein obtaining original information of the user from the information source comprises:
   obtaining the original information of the user from the information source according to a user identifier list.

3. The method according to claim 2, wherein the user identifier list comprises an identifier of the information source and the identifier of the user in the information source.

4. The method according to claim 1, further comprising:
   receiving a user virtual image subscription request; and
   allocating a group of virtual images to the user according to the user virtual image subscription request.

5. The method according to claim 4, wherein the obtaining the user virtual image of the user comprises:
   selecting the virtual image of the user from the group of virtual images.

6. The method according to claim 1, wherein the virtual image of the user comprises at least one of a picture, an animation segment, an interactive picture, an audio, and a video.

7. The method according to claim 1, wherein the virtual image of the user complies with a hypertext markup language 5 (HTML5) standard.

8. The method according to claim 1, wherein the user status information comprises the identifier of the user, and an operation type comprising posting a topic.

9. A virtual image server, comprising:
   a processor;
   a non-transitory computer readable medium connected to the processor and having stored thereon instructions for causing the processor to:
      obtain original information of a user from an information source by calling an application programming interface (API) of the information source, wherein the information source is an application, and wherein the original information comprises an identifier of the user in the information source and contents posted by the user in an original source;
      parse the original information of the user, including parsing the contents posted by the user and extract keywords indicating a user status from the contents posted by the user, and to obtain user status information of the user from the parsed contents posted by the user;
      obtain a virtual image of the user from a virtual image database in accordance with a level of matching between the user status information and one or more tags associated with images of the virtual image database, wherein the virtual image matches the user status information; and
      notify a virtual image displaying terminal to display the virtual image of the user.

10. The virtual image server according to claim 9, wherein the non-transitory computer readable medium further has stored thereon instructions for causing the processor to:
    obtain a user identifier list, wherein the user identifier list comprises an identifier of the information source and the identifier of the user in the information source, and
    obtain the original information of the user from the information source according to the user identifier list.

11. The virtual image server according to claim 9, wherein the non-transitory computer readable medium further has stored thereon instructions for causing the processor to:
    receive a user virtual image subscription request and allocate a group of virtual images to the user according to the user virtual image subscription request.

12. The virtual image server according to claim 9, wherein the virtual image of the user comprises at least one of a picture, an animation segment, an interactive picture, an audio, and a video.

13. The virtual image server according to claim 9, wherein the virtual image of the user complies with a hypertext markup language 5 (HTML5) standard.

14. The virtual image server according to claim 9, wherein the user status information comprises the identifier of the user and an operation type comprising posting a topic.

15. A virtual image displaying terminal, comprising:
    a processor;
    a non-transitory computer readable medium connected to the processor and having stored thereon instructions for causing the processor to:
    send a virtual image update request comprising a user identifier to a virtual image server;
    receive, in response to the virtual image update request, a user virtual image returned by the virtual image server, wherein the user virtual image is a user virtual image selected by the virtual image server from a virtual image database according to user status information obtained by parsing contents of original information posted by the user to extract keywords indicating a user status and further according to a level of matching between the user status information and one or more tags associated with images of the virtual image database; and
    display the obtained user virtual image.

16. The terminal according to claim 15, wherein the non-transitory computer readable medium further has stored thereon instructions for causing the processor to:
    send a virtual image subscription request to the virtual image server so that the virtual image server allocates a group of virtual images to a user according to the subscription request.

* * * * *